(12) United States Patent
Bagshaw

(10) Patent No.: US 12,610,007 B1
(45) Date of Patent: Apr. 21, 2026

(54) SYSTEM AND METHOD FOR DISABLING TEXTING WHILE DRIVING

(71) Applicant: Idoniboye Benaiah Bagshaw, San Diego, CA (US)

(72) Inventor: Idoniboye Benaiah Bagshaw, San Diego, CA (US)

( * ) Notice: Subject to any disclaimer, the term of this patent is extended or adjusted under 35 U.S.C. 154(b) by 0 days.

(21) Appl. No.: 19/071,233

(22) Filed: Mar. 5, 2025

(51) Int. Cl.
| | |
|---|---|
| *H04M 3/00* | (2024.01) |
| *G06Q 30/0226* | (2023.01) |
| *H04M 1/72454* | (2021.01) |
| *H04M 1/72463* | (2021.01) |

(52) U.S. Cl.
CPC .. *H04M 1/724634* (2022.02); *G06Q 30/0226* (2013.01); *H04M 1/72454* (2021.01)

(58) Field of Classification Search
CPC .. H04M 1/724; H04M 1/634; H04M 1/72454; G06Q 30/0226
USPC ........................................................ 455/418
See application file for complete search history.

(56) References Cited

U.S. PATENT DOCUMENTS

| | | | | |
|---|---|---|---|---|
| 8,456,297 | B2 * | 6/2013 | van Os | G01C 21/367 |
| | | | | 340/425.5 |
| 9,195,290 | B2 * | 11/2015 | Siliski | G01C 21/367 |
| 2009/0309787 | A1 * | 12/2009 | Gildea | G01C 21/3641 |
| | | | | 342/357.31 |
| 2009/0312038 | A1 * | 12/2009 | Gildea | G01S 19/52 |
| | | | | 342/357.31 |
| 2013/0295910 | A1 * | 11/2013 | Enty | H04W 4/48 |
| | | | | 455/419 |
| 2016/0183069 | A1 * | 6/2016 | Wilson | H04W 4/14 |
| | | | | 455/466 |
| 2018/0359354 | A1 * | 12/2018 | Villaume | H04W 4/023 |
| 2020/0258049 | A1 * | 8/2020 | Forbush | H04W 4/50 |
| 2022/0253941 | A1 * | 8/2022 | Gouda | G07C 5/0841 |
| 2024/0383484 | A1 * | 11/2024 | Gouda | G06Q 40/08 |

\* cited by examiner

*Primary Examiner* — Temica M Beamer
(74) *Attorney, Agent, or Firm* — Dale J Ream

(57) ABSTRACT
A software application that implements a system and method for preventing texting by a mobile telephone being transported in a vehicle moving at a speed greater than a predetermined speed. Captured or prevented texts are stored until the vehicle has reduced its speed appropriately or stopped altogether at which point captured text are published. Analytic data specific to a safe driving mode, including start, and, duration, and route data may be published and a safe driving score calculated.

9 Claims, 2 Drawing Sheets

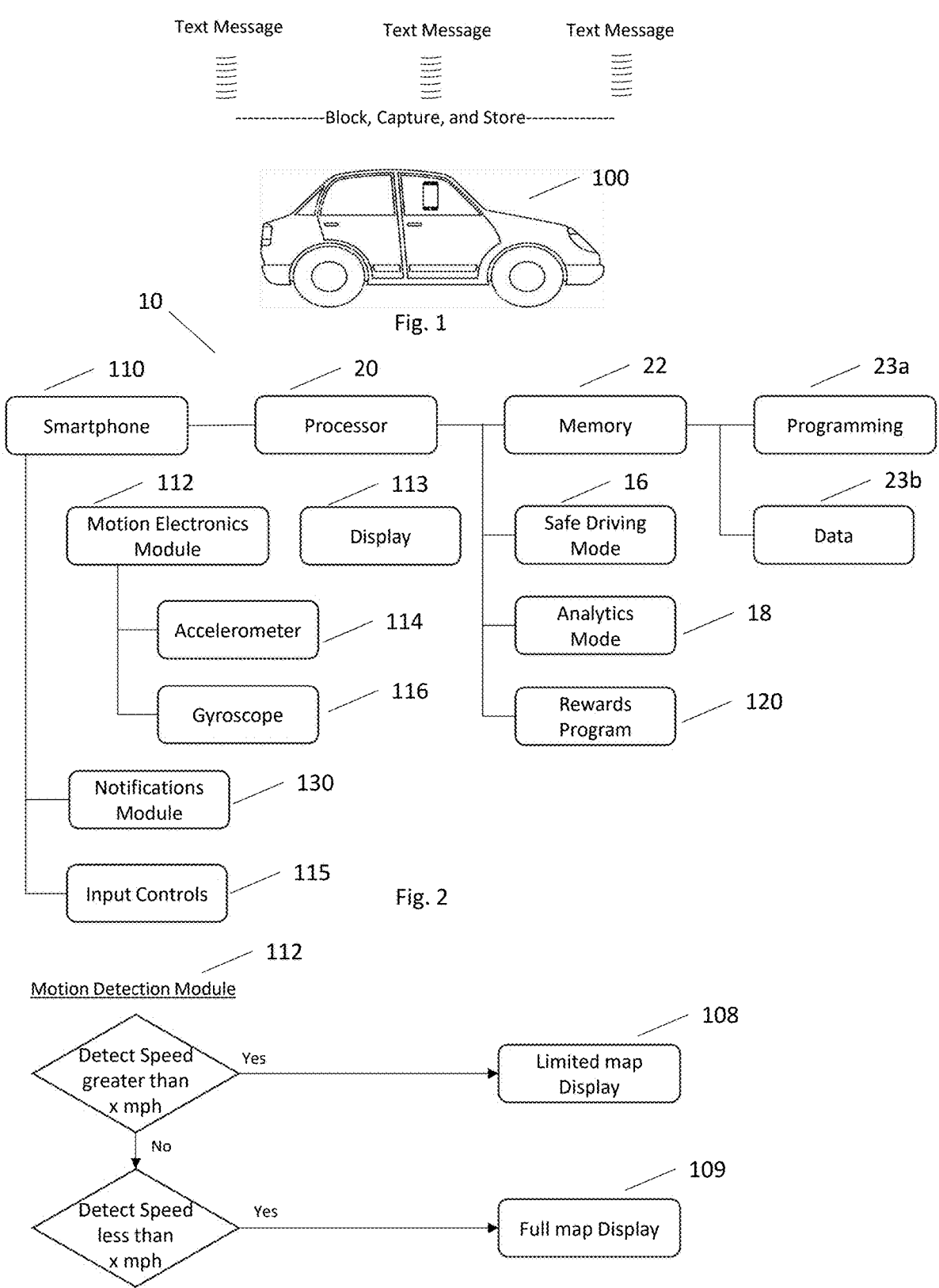

Text Message     Text Message     Text Message

----------------Block, Capture, and Store----------------

110    Smartphone

20    Processor

22    Memory

23a    Programming

112    Motion Electronics Module

113    Display

16    Safe Driving Mode

23b    Data

114    Accelerometer

18    Analytics Mode

116    Gyroscope

120    Rewards Program

130    Notifications Module

115    Input Controls

Motion Detection Module

Detect Speed greater than x mph — Yes → Limited map Display   108

No

Detect Speed less than x mph — Yes → Full map Display   109

Fig. 3

SYSTEM AND METHOD FOR DISABLING TEXTING WHILE DRIVING

REFERENCE TO RELATED APPLICATIONS

This is a non-provisional patent application that is related to provisional application 63/548,285 filed Nov. 13, 2023 titled System and Method for Disabling Texting while Driving which is incorporated herein by reference in its entirety.

BACKGROUND OF THE INVENTION

This invention relates generally to a system and method for disabling the receipt and sending of text messages to or from a mobile phone while the phone is determined to be positioned inside an automobile moving faster than a pre-determined speed.

In our increasingly connected world, mobile phones have become integral to our daily lives, serving as tools for communication, information, entertainment, and more. However, the advantages they bring can sometimes also pose dangers, particularly when used during tasks that require full attention, such as driving. Distractions from mobile phones, especially texting, have been identified as a significant factor in road accidents worldwide.

Texting while driving has emerged as a widespread and significant public safety concern. Specifically, the research confirms the heightened dangers associated with texting at medium to high speeds and sheds light on the need for increased awareness, education, and even insurance policy interventions. A major reason for automobile crashes is cognitive distractions experienced by a driver. Engaging in text conversations divert a driver's cognitive focus away from the road. Studies have shown that the human brain struggles to multitask effectively, resulting in delayed reactions and compromised decision-making abilities. This cognitive distraction is exacerbated when vehicles are operated at elevated speeds.

Operating a vehicle at medium to high speeds requires precise control and quick reflexes. As speeds increase, so too does the potential for catastrophic crash outcomes. The exponential relationship between speed and kinetic energy magnifies the force of collisions, leaving less time for drivers to react to unexpected events. Texting compounds the drivers by further impairing the driver's ability to process information and make split-second decisions. Studies have shown that texting while driving at high speeds can extend a driver's reaction time by several crucial seconds. This delay can be the difference between avoiding a collision and a tragic accident. The increased velocity at which vehicles travel amplifies the risk and leaving little margin for error.

While many jurisdictions have recognized the dangers of texting while driving, enforcement and compliance remain a challenge. Stricter penalties, comprehensive education programs, and increased enforcement efforts are needed for curbing this perilous behavior. In addition, smartphone applications, vehicle-integrated systems, and other innovative tools are useful in crafting overall solutions to the problem of texting while driving. Even so, there is still a need for increasing and improving driver compliance and participation with the concept of a total ban on texting in a vehicle that is moving at greater than a predetermined speed.

Therefore, it would be desirable to have a system and method for preventing a mobile phone from receiving or initiating text messages when motion greater than a predetermined speed is detected and indicative of driving an automobile. Further, it would be desirable to have a system and method that utilizes analytics to identify the driver compliance with anti-texting safe mode software technology, automatically promotes a safe driving lifestyle to the driver's social media platform, and correlates with insurance policy rewards for safe driving.

SUMMARY OF THE INVENTION

This invention is directed to a system and method for preventing receipt were initiation of text messaging functionality of a mobile telephone when the mobile telephone is determined to be traveling in an automobile at greater than a predetermined speed.

Therefore, a general object of this invention is to provide a computer implemented application for installation on a smart phone of a type having motion sensors such as an accelerometer, gyroscope, and GPS coordination capable of determining if the phone is moving as a result of driving.

Another object of this invention is to provide a system and method, as aforesaid, that implements a safe mode in which incoming signals indicative of a text message are blocked from live publication but are retained for publication when the mobile phone is no longer moving or moving at a speed less than a predetermined speed.

Still another object of this invention is to provide a system and method, as aforesaid, that includes analytics capable of determining a frequency, duration, and other metrics regarding proper usage of the safe mode of the anti-texting app.

A further object of this invention is to provide a system and method, as aforesaid, that includes initiation of a comprehensive safety lifestyle being uploaded to the cell phone owner's social media platforms.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1 is a diagram view of a system for disabling texting on a mobile phone while driving according to the present invention;

FIG. 2 is a block diagram of the system architecture associated with the present invention;

FIG. 3 is a flowchart illustrating the motion detection module of the system as in FIG. 2;

DESCRIPTION OF THE PREFERRED EMBODIMENT

Figure 4:
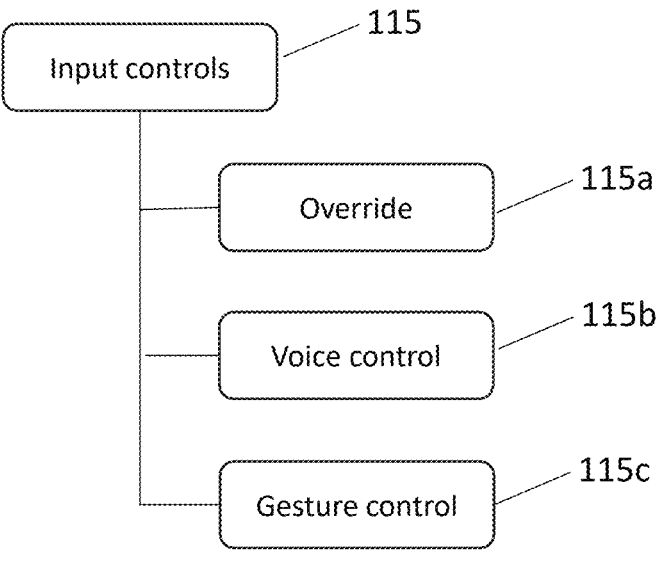
FIG. 4 is a block diagram illustrating the input controls associated with the system of FIG. 2.

A system and method for disabling texting technology implemented via a software application for preventing the receipt of text notifications on a mobile telephone, particularly while the mobile telephone is located within a moving automobile 100. The apparatus and method 10 aim to enhance road safety by reducing driver distractions, while also providing incentives for safe driving behavior. The system and method 10 includes computer programming executed by a processor 20 and stored in a non-volatile memory 22 on a smart phone 110 or similar electronic device that itself includes electronic motion detection components and text notification technology.

The primary objective of this app is to create an intuitive, effective, and user-friendly solution that genuinely reduces the risk of texting while driving. The app seeks to:

1. Automatically Detect Movement: Understand when a user is in a moving vehicle using advanced algorithms and phone sensors.

2. Engage Safe Driving Mode 16: Proactively minimize distractions by disabling text notifications and offering other supportive features.

3. Educate Users: Through analytics and feedback, provide insights into driving habits, reinforcing the importance of undistracted driving.

4. Adapt to Individual Needs: While safety is paramount, the app will also provide customization options to cater to individual needs, ensuring usability doesn't compromise safety.

5. Seamlessly Integrate: The app should work smoothly across both primary mobile platforms (iOS & Android) and be easy to integrate into a user's daily routine.

In essence, the goal is not just to develop an application but to foster a culture of safety and responsibility. By ensuring that the software app can seamlessly fit into the everyday lives of its users, a long-term solution is fostered to the persistent and dangerous problem of texting while driving.

In the preferred embodiment, the mobile telephone 110 includes motion detection electronics 112 configured to generate motion data indicative of the movement of the automobile 100 in which the mobile phone 110 is being carried. The motion detection electronics 112 may incorporate an accelerometer 114 and a gyroscope 116 to measure velocity and orientation changes. These components are embedded within the mobile telephone 110 and provide real-time data regarding the motion state of the vehicle.

The mobile telephone 110 further includes a notifications module 130 capable of receiving textual identification signals associated with incoming text messages. The notifications module 130 communicates with a processor 20, which executes program instructions (i.e. programming 23a) stored in a non-volatile memory 22. The memory 22 is also configured to store data 23b taken from various sensors and modules described herein, the memory 22 is in data communication with the processor 20. The processor 20, memory 22, motion detection electronics 112, and notifications module 130 are integrated within the mobile telephone 110 to ensure seamless operation of the apparatus.

M ore particularly, the processor 20 may be programmed to repeatedly access data from the phone's accelerometer 114 and gyroscope 116 so as to determine if the phone is moving. While this data is normally utilized to detect if a mobile phone 110 has been dropped or even if a significant automobile accident has occurred, this data can certainly be used to determine if the phone is moving in a manner indicative of driving. Further, the processor 20 may also access the phones GPS sensors to determine speed, direction, and location data. It is understood that the analytics mode 18 of the present invention may determine if the safe mode software application was utilized or overridden during residential driving or, worse yet, on high-speed highways. For instance, a driver may lose significant points on a safety scale if the driver disengaged the safe driving mode 16 and sent or received a text, especially while driving at a high rate of speed. This is the type of correlation between technology and regulatory and insurance policy that is needed to face the texting while driving dilemma.

Next, the actual safe driving mode 16 will be described with reference to FIG. 5. The processor 20 according to the present invention is configured to intercept and manage texting notifications. In other words, texting signals received by the respective cell phone 110 may be intercepted and suppressed (FIG. 1) such that the driver is not even aware of their existence until motion of the phone (and, therefore, the vehicle) has ceased or at least been reduced below a predetermined speed. Preferably, the safe driving mode 16 is initiated automatically whenever the motion sensors detect motion indicative of driving above a predetermined speed. Similarly, all other functions or software modules associated with the mobile device may also be disabled so as to further limit distractions.

More particularly, the processor 20, executing programming 23a stored in memory 22, is configured to initiate a safe driving mode 16 when the motion detection electronics 112 detect that the automobile is moving at a speed greater than a predetermined threshold (e.g., 10 mph). Accordingly, the safe driving mode 16 is preferably actuated automatically based on the speed of the automobile in which the phone is situated. Alternatively, however, the safe driving mode 16 and other futures may be initiated using input controls 115 of the mobile telephone 110 work via detection of voice commands. The safe driving mode 16 is configured for:

Capturing textual identification signals received by the notifications module 130 and storing the captured signals in the memory 22 until the automobile slows to below the predetermined speed (FIG. 1).

Figure 5:
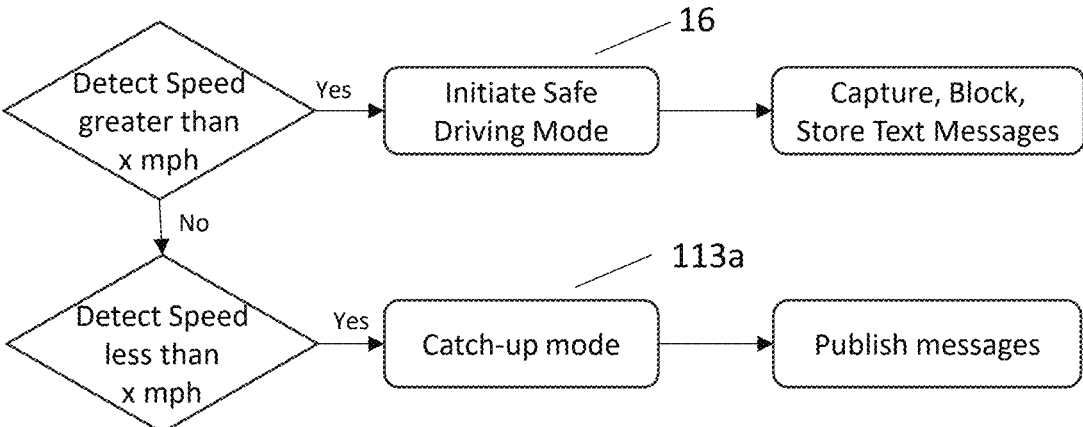
FIG. 5 is a flowchart illustrating the safe mode function associated with the present invention.

Publishing the stored signals to the user when the automobile is motionless or moving below the predetermined speed (FIG. 5). For instance, publication may include a visual presentation on a display 113 of the smart phone 110.

In an embodiment, however, the safe driving mode 16 may be overridden by a driver in case of an emergency, e.g., the need to call medical personnel to attend to an acute health condition or the like. A user control that actuates an override is indicated with reference 115a (FIG. 4). Similarly, the app may be programmed to allow notifications to publish as normal in predetermined circumstances, such as a notification of a tornado warning, major traffic accident, or the like. Notes regarding any interruption of a safe mode functionality may be indicated in a later analytics report so that a driver is not penalized unfairly. For the sake of implementing the functionality described above, the mobile telephone 110 may include input controls 115, one of which (115a) may be programmed to override the safe driving mode 16 when actuated. For instance, one of the buttons on the keypad may be programmed to include this override functionality in a manner similar to a one-touch feature to call home or to call one's workplace.

Driver distractions may also be minimized by requiring incoming notification to utilize the text-to-speech and speech synthesizer functions traditionally found on a mobile phone operating system. For example, incoming calls from the same source may be indicated using a predetermined audio prompt so as to eliminate a driver's need to even look at the cell phone itself. Input controls 115 representing voice recognition or voice commands are indicated in the drawings using reference 115b. Similarly, input controls 115 representing the use of gestures are indicated in the drawings using reference 115c (FIG. 3).

Still further, another major aspect of the present invention is that the processor 20 may be programmed and configured to display a stripped-down or simplified mapping interface

108 showing only crucial details like turns or destinations such that visual distractions. It is understood that the processor 20 may be programmed to display a full mapping interface 109 when the vehicle is motionless or moving at less than the predetermined speed but to display only a simplified map when the vehicle is indicative of moving at greater than the predetermined speed. It is understood that additional mapping software or programming configured to strip off predetermined indicia from traditional maps may be required as part of the present invention.

The system and method implemented herein may include additional features. Namely, the system may include what is referred to as a catch-up feature 113a wherein once the mobile device is no longer moving, a summary of blocked calls and texts may be presented, such as publication via the display 113. Further, the app may provide monitoring features for parents allowing them to receive notifications when the app is deactivated by an underage driver. With further reference to analytics, the app may calculate and display a "Safe Driving Score" based on how well a user complies with safe driving practices. The analytics module may also display a detailed trip summary indicative of an exact route of travel, when the safe driving mode was or was not utilized along said route, and the like.

The additional features described above may be summarized as follows:

1. Catch-Up Mode: After the safe driving mode is deactivated, the processor 20, exercising programming 23a stored in the memory 22, may activate a "catch-up mode" 113a allowing the user to access calls or text messages that were blocked while the safe driving mode 16 was actuated.
2. Emergency Override: When appropriately actuated, the processor is configured to override 115a the safe driving mode and publish blocked text messages if they are indicative of an emergency condition. Emergency conditions may also be communicated using audible or vibratory components mounted within the cellular telephone. It is understood that emergency notification or alarm features may be implemented via a wearable device in data communication with the processor and notifications modules. The wearable device may be in the form of a wristwatch, bracelet, earpiece, headband, or the like. The present system and method may be in data communication with the wearable's sensors to monitor heart rate and stress levels, sending an alert if elevated levels are detected.
3. Notifications of Deactivation: The processor automatically transmits notifications to predetermined entities, such as family members or employers, indicating that the safe driving mode has been deactivated while the vehicle is in motion.
4. Audible and Gesture Controls: The processor can activate or deactivate the safe driving mode upon detecting predetermined audible commands 115b or gestures 115c, allowing for hands-free operation (FIG. 4).

Further, the mobile application that implements the system and method 10 according to the present invention may include an analytics mode 18 that is configured to determine the start and end times of a safe mode event, the respective duration of safe mode usage, and a determination of the type and speed of roadways over which the vehicle was operated during the safe mode event. It is understood that this data may be automatically uploaded to the driver's insurance company, as determined during a set up routine, may be uploaded to social media platforms associated with the driver, or may be correlated to respective articles, brochures, blog sites, insurance advice, and the like. It is understood that uploaded data will be specific to a respective driver according to the analytics specifically associated with said driver. In a critical aspect of the invention, the software application that implements the present apparatus and method includes and integrates a rewards program 120 that automatically awards points, publishes recognition, imparts insurance discounts, or gives other tangible incentives (such as gift certificates to restaurants or the like). Similarly, the application may be programmed to track the number of "safe" trips made without accessing the phone such that a driver may collect "safety points" for maintaining a clean track record over time.

In use and as shown in FIG. 5, when the automobile starts moving, the accelerometer 114 and gyroscope 116 in the motion detection electronics 120 measure the motion data. If the speed exceeds the predetermined threshold, the processor 20 initiates the safe driving mode 16, blocking, capturing, and storing textual identification signals. When the vehicle slows below the threshold speed, the processor 20 publishes the stored text messages to the user and updates the rewards program 120 with new analytical data.

Accordingly, this system enhances safety by reducing driver distractions, promotes safe driving behavior through a rewards program, and incorporates user-friendly features like catch-up mode, emergency overrides, and hands-free controls.

It is understood that while certain forms of this invention have been illustrated and described, it is not limited thereto except insofar as such limitations are included in the following claims and allowable functional equivalents thereof.

The invention claimed is:

1. A computer-implemented method of preventing receipt of textual notifications on a mobile telephone of a type having motion detection electronics, said method of preventing receipt of textual notifications, comprising:

accessing motion data generated by motion detection electronics in the mobile telephone to determine when movement of an automobile within which the mobile telephone is positioned is moving at greater than a predetermined speed;

activating a catch-up mode after the safe driving mode is deactivated, wherein calls or text messages blocked during the safe driving mode are made available to the user;

initiating a safe driving mode when motion data indicates the automobile is moving at greater than the predetermined speed, said safe driving mode configured specifically to prevent receipt or initiation of text messages, track compliance, provide analytics, and award points to the user; and displaying a simplified map interface while the automobile is moving above the predetermined speed and displaying a full mapping interface when the automobile is at rest or moving below the predetermined speed, wherein said map display is integrated with safe driving mode operations.

2. The method as in claim 1, wherein the safe driver rewards program includes sharing or comparing said analytics with correlated mobile telephones.

3. The method as in claim 1, further comprising automatically transmitting notifications to predetermined entities indicating that the safe driving mode has been deactivated while the automobile is moving.

4. The method as in claim 1, further comprising selectively activating or deactivating the safe driving mode when a predetermined audible command is detected.

5. The method as in claim 1, further comprising selectively activating or deactivating the safe driving mode when a predetermined gesture is detected.

6. The method as in claim 1, wherein said motion detection electronics include an accelerometer and gyroscope of the mobile telephone.

7. A computer-implemented method of preventing receipt of textual notifications on a mobile telephone of a type having motion detection electronics, said method comprising:

accessing motion data generated by motion detection electronics in the mobile telephone to determine when movement of an automobile within which the mobile telephone is positioned is moving at greater than a predetermined speed;

initiating a safe driving mode when motion data indicates the automobile is moving at greater than the predetermined speed, said safe driving mode configured specifically to prevent receipt or initiation of text messages, track compliance, provide analytics, and award points to the user; and displaying a simplified map interface when the automobile is moving at greater than the predetermined speed and displaying a full mapping interface when the automobile is motionless or moving at less than the predetermined speed;

wherein said map display is integrated with safe driving mode operations.

8. The method of claim 7, further comprising automatically transmitting notifications to predetermined cell phone numbers indicative that the safe driving mode has been deactivated while the motion data is indicative that the automobile is moving.

9. The apparatus for preventing receipt of text notifications as in claim 8, further comprising overriding said safe mode and publishing respective text messages that are indicative of an emergency condition.

\* \* \* \* \*